United States Patent [19]

DiMatteo et al.

[11] Patent Number: 4,508,452

[45] Date of Patent: * Apr. 2, 1985

[54] ARRANGEMENT FOR SENSING THE CHARACTERISTICS OF A SURFACE AND DETERMINING THE POSITION OF POINTS THEREON

[75] Inventors: Paul L. DiMatteo, Huntington; Joseph A. Ross, Fort Salonga; Howard K. Stern, Greenlawn, all of N.Y.

[73] Assignee: Robotic Vision Systems, Inc., Hauppauge, N.Y.

[*] Notice: The portion of the term of this patent subsequent to Feb. 11, 1992 has been disclaimed.

[21] Appl. No.: 44,642

[22] Filed: Jun. 1, 1979

Related U.S. Application Data

[63] Continuation of Ser. No. 608,266, Aug. 27, 1975, Pat. No. 4,185,918.

[51] Int. Cl.³ .................... G01B 11/24; G01C 11/02; G01B 11/00
[52] U.S. Cl. .................... 356/375; 356/376; 356/389; 356/397
[58] Field of Search .................... 356/375–376, 356/2, 388–389, 393, 397, 1, 152; 250/558

[56] References Cited

U.S. PATENT DOCUMENTS

| | | | |
|---|---|---|---|
| 3,040,620 | 6/1962 | Ferris | 355/41 |
| 3,234,863 | 2/1966 | Peterson et al. | 355/77 |
| 3,619,065 | 11/1971 | Falconbridge | 356/376 |
| 3,735,036 | 5/1973 | Macovski | 356/376 |
| 3,832,693 | 8/1974 | Ishizaki et al. | 178/19 |
| 3,866,052 | 2/1975 | DiMatteo et al. | 356/2 |
| 3,876,303 | 4/1975 | Talts | 355/77 |
| 4,185,918 | 1/1980 | DiMatteo et al. | 356/375 |

FOREIGN PATENT DOCUMENTS 750543 1/1945 Fed. Rep. of Germany ........ 355/40

OTHER PUBLICATIONS

Anuta et al., "Map Matching System", IBM Tech. Disc. Bull., 10-1964, pp. 372-373.
Altenhofen-Hedden, "Transformation & Rectification", Chapt. 26 of Manual of Photogrammetry, 3rd Edition, 1966, American Soc. of Photogrammetry, pp. 846-849.

Primary Examiner—William H. Punter
Attorney, Agent, or Firm—Max Fogiel

[57] ABSTRACT

The surface to be sensed or scanned is placed in the path of a projector which is moved along an axis of the surface. The path of motion of the projector is subdivided into predetermined sections which are illuminated by the projector in accordance with a predetermined sequential pattern. This procedure of moving the projector is repeated a predetermined number of times, with a separate illuminating pattern prevailing each time that the projector is moved relative to the surface and traverses the entire surface to be scanned. The combinations of the patterns obtained from the repeated scannings of the projector define closely-spaced sections of the surface. The patterns are coded so that each section is uniquely defined in coded form. A camera having the entire surface within its field of view photographs the surface each time that the projector is moved along the axis of the surface.

12 Claims, 49 Drawing Figures

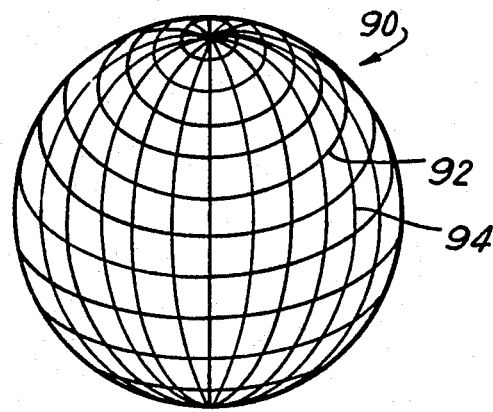
FIG. 15
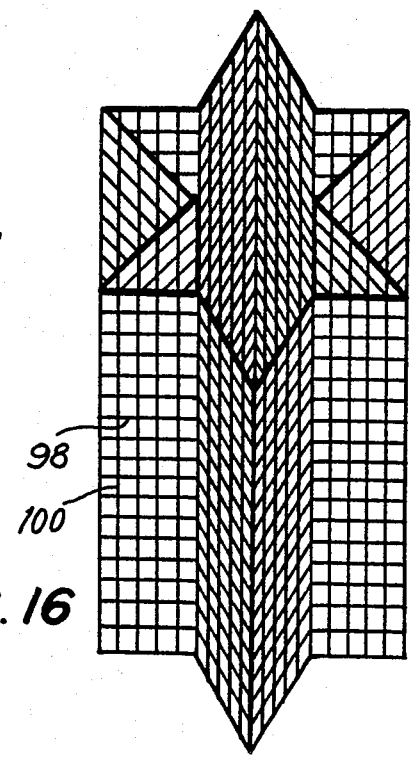
FIG. 16
FIG. 17
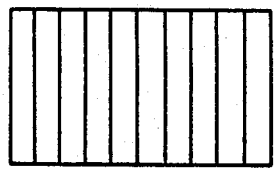
(a)
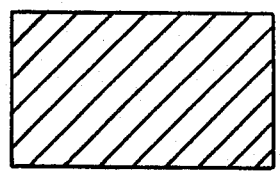
(b)
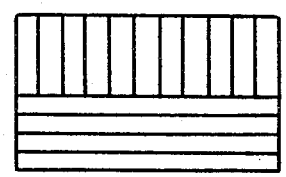
(c)
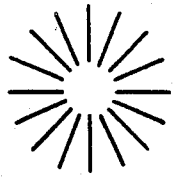
(d)
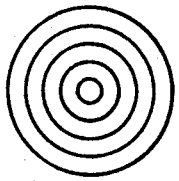
(e)
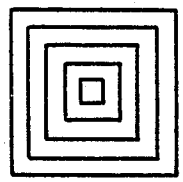
(f)
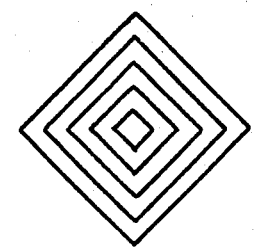
(g)
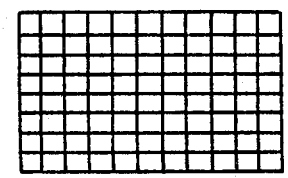
(h)

ARRANGEMENT FOR SENSING THE CHARACTERISTICS OF A SURFACE AND DETERMINING THE POSITION OF POINTS THEREON

This is a continuation of application Ser. No. 608,266 filed Aug. 27, 1975, now U.S. Pat. No. 4,185,918.

BACKGROUND OF THE INVENTION

In the reproduction or fabrication of complex surfaces, it is often essential to determine the spatial locations of points on the surface. In order to reproduce or fabricate a surface with substantial precision, it is necessary to specify a substantially large number of closely-spaced points.

Heretofore, the measurements of points on a complex surface was carried out in a laborious manner by recording the positions of the points methodically until the surface has been specified with the required amount of precision. The taking of measurements of the points on the surface often involved making contact with the surface with an instrument, for example. The final amount of recorded data, furthermore, was voluminous and difficult to analyze. In view of the large amount of data which had to be recorded with respect to a large number of points in order to achieve a predetermined precision, it was particularly susceptible to the introduction of measuring and recording errors.

Accordingly it is an object of the present invention to provide an arrangement in which a surface is scanned and subdivided into a substantially large number of sections, so that points on the surface may have their positions determined with substantially high resolution.

Another object of the present invention is to provide an arrangement in which each of the subdivided sections of the surface is assigned a predetermined code which defines the section uniquely from the other sections.

A further object of the present invention is to provide an arrangement of the foregoing character in which the surface may be scanned a minimum number of times to achieve a predetermined resolution of sections and accompanying precision.

A still further object of the present invention is to provide an arrangement, as described, in which the spatial positions of points within each section may be determined by correlating the points to a reference surface scanned independently by the projector and photographed by a camera.

It is a particular object of the present invention to sense the characteristics of the surface and determine the positions of points thereon without physically contacting the surface, by carrying out the procedures involved with optical means.

SUMMARY OF THE INVENTION

The objects of the present invention are achieved by placing the surface to be analyzed, within the optical path of a projector which may be moved relative to the surface along an axis of the surface. As the projector is transported or moved along that axis of the surface, the projector illuminates preselected sections of the surface. The illuminated and non-illuminated sections combine to form a predetermined pattern corresponding to an assigned code. The projector is moved repeatedly along the axis of the surface to produce a separate pattern for each scanning of the surface along that axis. The different patterns, when taken in combination, subdivide the surface into a substantially large number of sections, in accordance with a predetermined digital code. The code is selected, in accordance with the present invention, so that a large number of subdivided sections are obtained for a relatively few scannings or traversals of the surface by the projector.

Each pattern of sections corresponding to a single scanning or traversal of the surface by the projector, is photographed by a camera which has the entire surface within its field of view. The photographs taken by the camera are correlated to photographs similarly taken of a reference surface to establish the spatial locations of points on the surface.

Selective illumination of the surface by the projector may be carried out by any one of various forms of electromagnetic radiation available, and the subdivision of the surface into sections may be carried out along advantageous axes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 15 is a perspective view and shows the use of a spherical surface for the reference surface;

FIG. 16 is a perspective view and shows a further embodiment of the reference surface;

FIGS. 17a–h are schematic views showing various methods for subdividing the surface to be analyzed or investigated, in accordance with the present invention.

DESCRIPTION OF THE PREFERRED EMBODIMENTS

Figure 1:
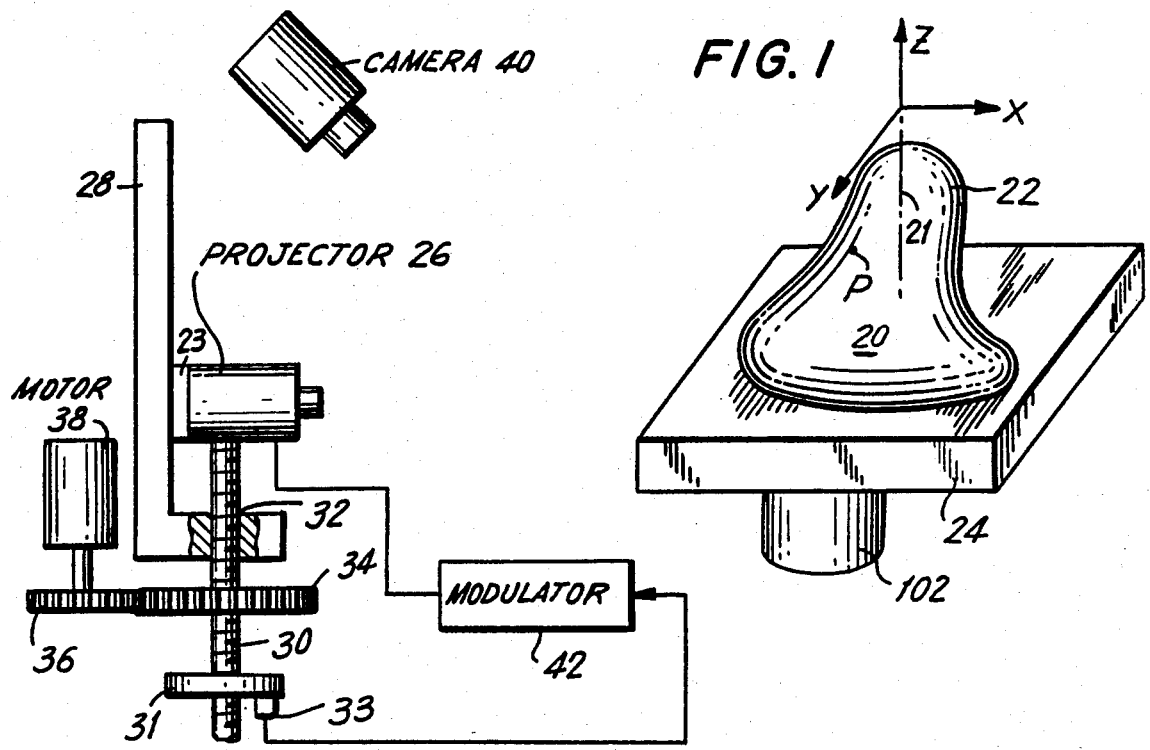
FIG. 1 is a schematic view and shows the relative arrangement of the surface to be analyzed or investigated, the projector, and the camera, in accordance with the present invention.

Referring now to the drawing and in particular to FIG. 1, an object 20 having a surface 22 is placed on a support 24. A projector 26 is movable along a supporting frame 28 by means of a mechanism which includes, for example, a lead screw 30 rotatable within a threaded opening 32 in the frame 28, a gear 34 for rotating the lead screw and meshing with a pinion 36 connected to the shaft of a motor 38. The lead screw 30 has a key slot along its length to allow longitudinal displacement of the lead screw relative to the gear 34 while being rotated by this gear 34. The frame 28 serves to support and guide the projector 26 in its path of motion. The lead screw 30 can also be driven directly by the shaft of motor 38, without the intermediate gears 34, 36.

The projector 26 is moved along the supporting frame 28 in a path directed substantially along the axis 21 of the surface 22.

During the period of time that the projector 26 is moved in its path on the support 28 in direction parallel to the axis 21, for example, the projector illuminates preselected portions of the surface 22. The illumination of the preselected sections is carried out on the basis that the surface 22 is to be subdivided into a substantially large number of sections for a relatively few scannings of the surface by the projector 26. Thus, the projector 26 is moved along the support 28 a relatively few number of cycles while providing data for subdividing the surface 22 into a substantially large number of sections or intervals to obtain sections of high resolution. The relationship between the number of traversals or cycles of the projector along the support 28, and the number of subdivided sections of the surface 22 is obtained in the following manner.

If the surface 22 is to be subdivided into N sections corresponding to a predetermined precision or resolution, then this quantity N may be expressed by the series of binary terms $N = 2^0 + 2^1 + 2^2 + 2^3 + 2^4 \ldots$.

Figure 2:
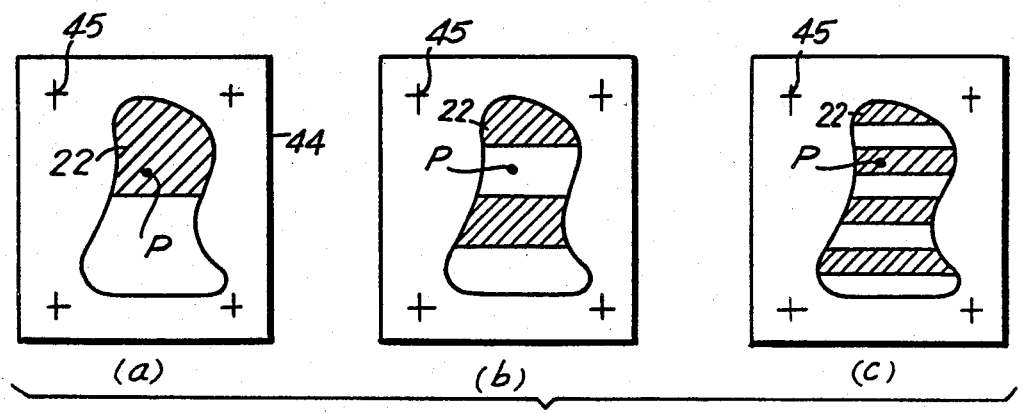
FIGS. 2a–c are plan views of typical photographs taken by the camera in the arrangement of FIG. 1.

From this series of binary terms, it may be seen that a substantially large number N may be obtained for a relatively few terms present in the sequence. To apply this principle to the present invention, each binary term in the sequence is made to correspond to a single cycle or traversal of the projector 26 along the axis 21 of the surface 22. During each cycle or traversal of the projector 26, a predetermined pattern of illumination is applied, corresponding to the particular binary term involved. Thus, for the binary term $2^1$, for example, the illuminating pattern of FIG. 2a is produced. In this pattern, the surface 22 is subdivided into two sections or intervals. The illuminated section in FIG. 2 is shown in cross-hatched form. The non-illuminated section is left vacant. In a similar manner, the binary term $2^2$ is represented by the illuminating pattern of FIG. 2b. In FIG. 2b, the surface 22 is subdivided into four sections. FIG. 2c corresponds, accordingly, to the binary term $2^3$, and in this FIG. 2c, the surface 22 is subdivided into eight sections or intervals.

Each illuminating pattern as represented by FIGS. 2a, 2b, and 2c, for example, is photographed by a camera 40 which has the entire surface 22 within its field of view. Whereas only three patterns are represented in the drawing to correspond to three separate binary terms, in practice the camera 40 photographs each pattern separately for as many binary terms as are necessary to obtain the quantity N. For each photograph taken by the camera 40, moreover, the projector 26 carries out a single cycle or traversal of scanning the surface 22.

Figure 3:
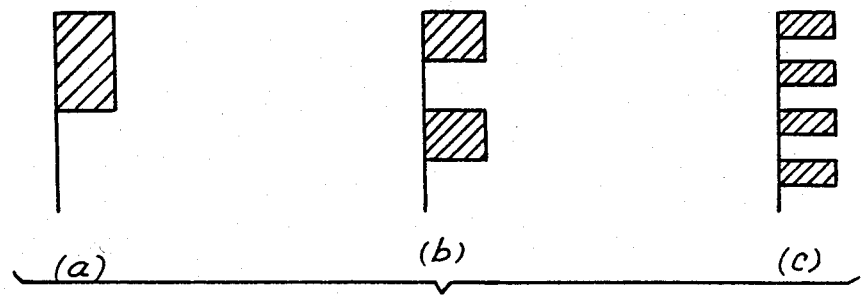
FIGS. 3a–c show waveforms of the control signal applied to the projector for producing the photographs of FIGS. 2a–c respectively.

To create the patterns of FIGS. 2a–c, for example, the illumination applied by the projector 26 is modulated during the period that the projector 26 travels on the support 28 to traverse the surface 22. In accordance with this arrangement, a modulator 42 switches on or off the illumination applied by the projector so as to produce the required one of the patterns. Thus, the modulator 42 switches the illumination on, for example, for the shaded bands or intervals in the patterns, and switches the illumination off for the remaining unshaded bands. The switching pulse applied by the modulator 42 to the projector 26 for producing the photographs 44 in FIGS. 2a–c, is shown respectively, in FIGS. 3a–c. In FIG. 3, the shaded portions of the waveform correspond repectively to the shaded portions or bands of FIGS. 2a–c. The vertical axes in FIGS. 3a–c correspond to the distances travelled by the projector 26 in traversing the surface 22.

In the use of the pure binary code to express the number N of subdivisions of the surface 22, as described above, each subdivision or band is assigned a unique code which serves to identify uniquely each band from the other remaining bands. Thus, bands numbered 5, 6 and 7 have, respectively, assigned codes 101000, 011000, and 111000. In a similar manner, every other band from the first one to the last one (band N) has a uniquely assigned binary code.

In accordance with the present invention, therefore, a relationship exists between the binary coded bands and the number of photoelectric 44 taken by the cameras 40. The relationship makes it possible for a relatively small number of photographs to include complete information of a substantially large number of bands. Thus, only ten photographs are required, for example, to specify completely 1,000 bands. The coded information on the bands may be inserted into a computer and applied in the following manner.

Figure 4:
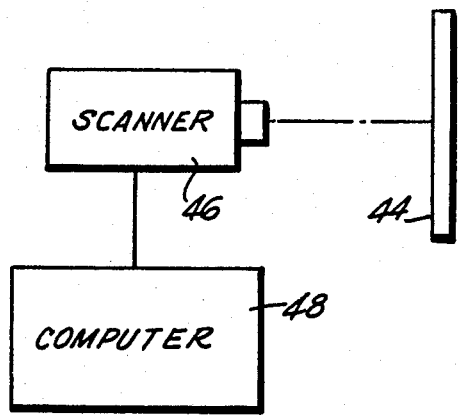
FIG. 4 is a schematic view and shows the arrangement for scanning the photographs of FIG. 2.

The photographs 44 are scanned in sequence by means of a photoelectric cell or an electron beam scanner 46, for example, and the scanned information is inserted into a computer 48, as shown in FIG. 4. A point P, for example, on the surface 22 will also appear in the photographs 44 taken by the cameras 40. The distance of the pattern projected by the projector in the vertical direction is less than the corresponding switching interval of the modulator.

Depending upon the particular photograph taken in the sequence of patterns as shown in FIG. 2, for example, the point P will appear within different shaded and non-shaded bands. If a shaded band is assigned the digit "1" and a non-shaded band is assigned the digit "0", then referring to FIG. 2, it is seen that in FIG. 2a the point P lies within a shaded band, so that a "1" may be assigned to FIG. 2a. Similarly, since the point P lies within a non-shaded band in FIG. 2b and within a shaded band once again in FIG. 2c, the digits "0" and "1" may be assigned, respectively, to FIGS. 2b and 2c in relation to point P. If the point P does not appear subsequently within a shaded band in any of the additional photographs which may be taken by the camera 40, then the position of the point P may have the code 101000 assigned to it. From this latter code, it may be observed that this binary code represents band number 5, and therefore point P must lie within this band number 5.

In practice, the scanner 46 using an electron beam, for example, detects or senses the point P on the photographs 44 which are scanned in sequence. The scanner 46 senses whether the point P lies within a shaded or a non-shaded band. The resultant information is inserted into the computer 48. The computer correlates the sequence of the photographs scanned, in relation to whether point P appears in a shaded or non-shaded band, and generates from this the binary coded number which defines a particular number of the band in which point P lies, such as band number 5 in the preceding example. From the information stored in the computer, the surface 22 may be readily reconstructed since each band is uniquely defined and the point P, therefore, will appear in the correct band on the reconstructed surface.

The scanning of photographic images for sensing information thereon as, for example, the point P, is well known in the art and is, for this reason, not described in further detail here. Furthermore, the scanner 46 may be in the form of an electron beam scanner, photoelectric or other optical scanner, for example. Registration marks 45 provided on the photographs serve as a reference for positioning the photographs in predetermined location prior to scanning.

In the embodiment described above for assigning a unique band identity for the point P, a pure binary code was used. The arrangement in accordance with the present invention can be extended to include other codes as well, such as decimal-binary codes, ternary codes, codes using shifting procedures, and combination of these, for example. When using a ternary code, therefore, the number of bands N into which the surface 22 is to be subdivided is expressed by the sequence of terms $N=3^0+3^1+3^2+3^3$.

Figure 5:
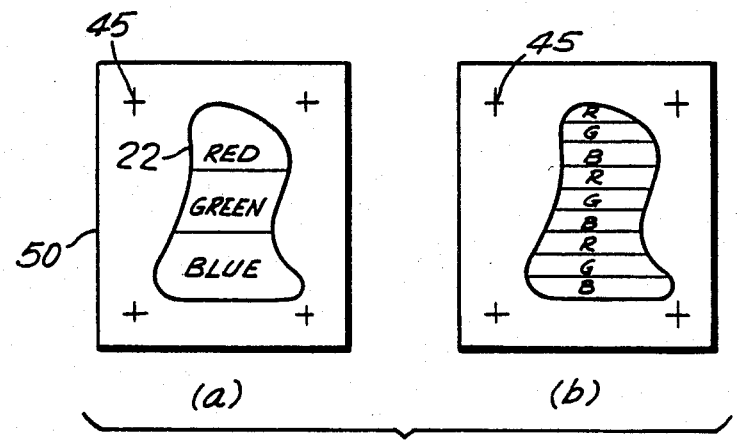
FIGS. 5a–b are plan views of photographs taken by the camera when using a method involving the projection of color bands on the surface to be analyzed, in accordance with the present invention.

In using the ternary code, a color scheme can be applied advantageously, in accordance with the present invention. In such a color scheme, three distinct colors as, for example, red, green, and blue may be used. In lieu of the shaded and non-shaded bands described above in relation to the binary system, alternating red, green and blue bands are used to illuminate the surface 22 by the projectors. In this arrangement, the photograph 50 taken by the camera corresponding to the term $3^1$, is represented in FIG. 5a. Similarly, FIG. 5b shows the photograph corresponding to the term $3^2$, it may be seen from this analysis, that alternating color bands may be used conveniently to subdivide the surface 22 into a sequence of distinct bands in a manner analogous to that described above for the binary code systems. When using a ternary code in conjunction with the color scheme, furthermore, a smaller number of photographs are required for a given number of subdivided bands N, than when the pure binary code is used. This may be seen from the sequence $N=3^0+3^1+3^2+3^3$, where fewer terms are required to attain the number N. Accordingly, whereas FIG. 5a includes three bands corresponding to the term $3^1$, FIG. 5b includes nine bands corresponding to the term $3^2$.

Figure 6:
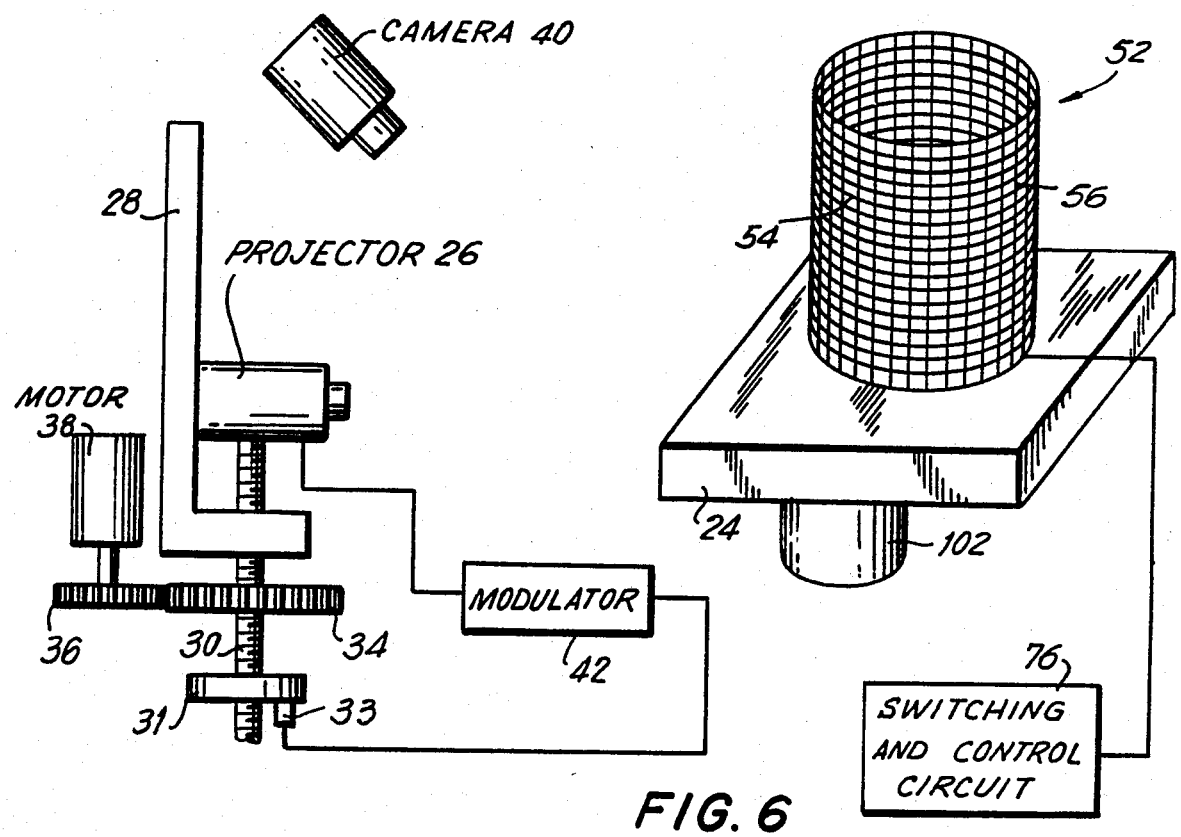
FIG. 6 is a schematic view and shows the arrangement of the present invention for obtaining points on a reference surface.

Extending the arrangement of the present invention still further, different frequencies of electromagnetic radiation may be used in lieu of the color bands, for example. The different frequencies may be applied to provide distinct identification for the separate bands such as the three separate color bands. It is, furthermore, not required that the electromagnetic radiation be within the visible spectrum. The projector 26 may illuminate the surface 22, for example, equally well with infrared radiation, and the cameras 40 may use film which is correspondingly sensitive to infrared. Accordingly, electromagnetic radiation within other parts of the spectrum may also be used with advantageous results. To find the coordinates of the point P in space, a reference surface 52 is used to replace the body 20 on the support 24. The general position of the reference surface 52 with respect to the projector 26 and the camera 40 is the same as for the body 20. In an advantageous embodiment of the reference surface 52, the latter is constructed of substantially cylindrical shape. The surface 52 is generated from substantially closely-spaced horizontal circular-shaped elements 54 and vertical elements 56 directed transverse to the elements 54. The arrangement is shown in FIG. 6.

Figure 7:
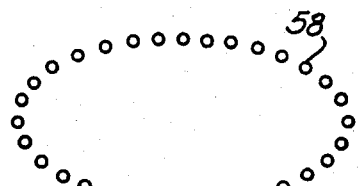
FIG. 7 is a plan view of an image seen by the camera of a band of the reference surface shown in FIG. 6.

The intersections of the elements 54 and 56 define points with known coordinates. Each of the elements 54 defines a horizontal plane, and if the intersections of the vertical elements 56 with one of the elements 54 were made luminous a photograph taken thereof by the camera 40 would appear as shown in FIG. 7. Since the line of sight of the camera 40 is not normal to the plane of the element 54, the latter appears as an ellipse, in the photograph, so that the luminous intersections 58 appear spaced about such an elliptical configuration in the photograph.

Each one of the points of intersection 58 has a predetermined known position in space, since it is located on the reference surface 52 having known geometrical dimensions. Furthermore, the position of the reference surface 52 with respect to the camera 40 may be accurately measured, and is therefore also known. Accordingly, by taking a series of photographs of elements 54 spaced to correspond to the spacing of the subdivided bands or intervals of the surface 22, a series of photographs as typically shown in FIG. 7, may be obtained for each subdivided band of interest. Furthermore, by closely spacing the vertical elements 56 in conjunction with the horizontal elements 54, closely-spaced points of intersection 58 may be obtained, and thereby any desired precision may be had with respect to the reference surface.

Figure 8:
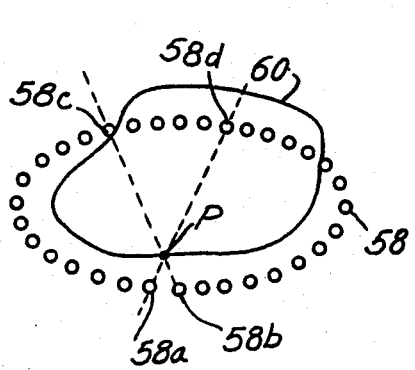
FIG. 8 is a plan view and shows the image of the reference surface in FIG. 7, superimposed on a corresponding image taken by the camera of the surface to be analyzed.

When the camera 40 takes a photograph of a band of the surface 22 which includes the point P, the image of that band on the photograph may appear as the shape or outline 60, for example, in FIG. 8. By then superimposing onto this photograph containing the shape 60, the configuration of FIG. 7, when corresponding to that same band in which point P is located, the spatial position of point P may be readily located by interpolation with respect to the neighboring points of intersection 58a and 58b, for example. Thus, since the positions of points of intersections 58a and 58b may be determined accurately, the location of point P may be measured or computed from the neighboring points 58a and 58b. Points 58d and 58e are used for interpolating to point P from points 58a and 58b, respectively.

Figure 9:
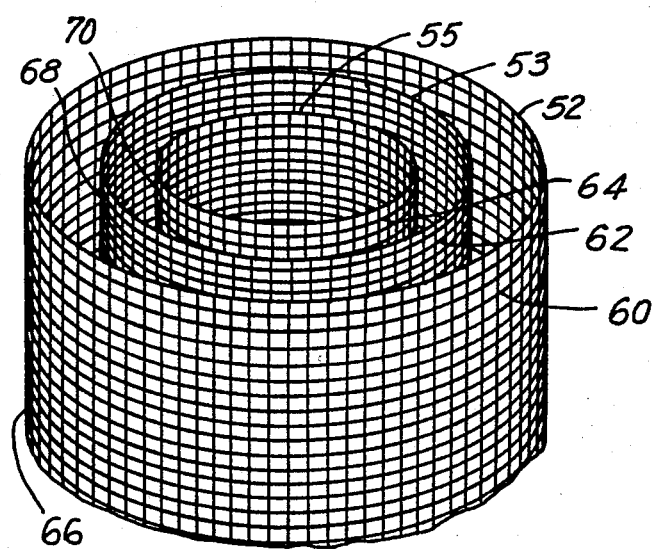
FIG. 9 is a perspective view and shows the arrangement of nesting reference surfaces, in accordance with the present invention.

To achieve increased accuracy in specifying the location of the point P, a reference configuration may be used as shown in FIG. 9, in which a plurality of reference cylinders are nested concentrically with respect to each other and placed on the support 24. In such an arrangement, an outer reference cylindrical surface 52, for example, surrounds additional interior concentric reference surfaces 53 and 55, for example. Each of the interior concentric reference cylinder surfaces are substantially of the same construction as the reference surface 52. The reference surfaces, furthermore, are constructed so that there are horizontal elements such as 60, 62, and 64, all at the same level on the reference surfaces 52, 53 and 55, respectively. These plurality of reference surfaces are also provided with vertical elements, respectively, 66, 68 and 70. If at a predetermined level corresponding to horizontal elements 60, 62 and 64, the intersections of these horizontal elements with their respective vertical elements 66, 68 and 70 were photographed, the configuration shown in FIG. 10 would result. Accordingly, there would be an array of luminous intersections 72, representing the intersections of the horizontal elements 60, 62 and 64 with their respective vertical elements 66, 68 and 70. By providing nested reference surfaces in this manner, substantially high precision may be obtained in specifying the location of a point line on the surface 22 within a band corresponding to the level of the elements 60, 62 and 64. For purposes of maintaining the distances used in interpolation substantially short, moreover, the cylindrical reference surfaces may be angularly displaced with respect to each other, so that a point of intersection 72a, for example, on the element 62 is situated angularly midway between adjacent intersections 72b and 72c on the element 60. In this arrangement, therefore, the point 72a does not lie on a radial line which may be drawn between the central axis of the cylinders and either one of the points of intersection 72b and 72c. Instead, point of intersection 72a lies on a radial line which is angularly positioned between the two radial lines through intersection points 72b and 72c.

Figure 11:
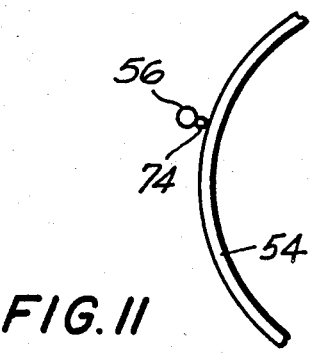
FIG. 11 is a partial plan view and shows the arrangement for obtaining luminous points on the reference surface in FIG. 6.

In the construction of the reference surfaces 52, 53 and 55, for example, these may be formed of conductive wire elements, whereby a typical horizontal wire element 54 cooperates with a vertical element 56 by way of a resistive element 74, as shown in FIG. 11. In accordance with this arrangement, the interception of the elements 54 and 56 is marked by making the resistive element 74 luminous. This may be accomplished by applying current, for example, through a circuit including the elements 54, 74 and 56 in series. If the resistive element 74 is in the form of an incandescent bulb, for example, then the element 74 will become luminous and detectable by the camera 40. The elements 54 and 56 of the reference structure, at the same time, may be made of sufficiently low resistance, so as to remain non-luminous. In using this principle for rendering the points of intersection on the reference surfaces luminous, the arrangement may be used in conjunction with incandescent bulbs, electroluminescent elements, or gas and arc discharge lamps, for example. At the same time, the element 74 may be made of, for example, a droplet of substantially high resistive material which becomes heated to a relatively higher temperature than the elements 54 and 56, when an electrical current is passed therethrough. When such a droplet of relatively high resistive material which may be derived from a metal joining compound, for example, is used, it is not necessary that the element 74 become luminous and visible to the human eye. The element 74 may, instead, only attain a relatively higher temperature than the elements 54 and 56, and this higher temperature may be sensed by a corresponding heat-sensitive film used in conjunction with the camera 40.

Figure 10:
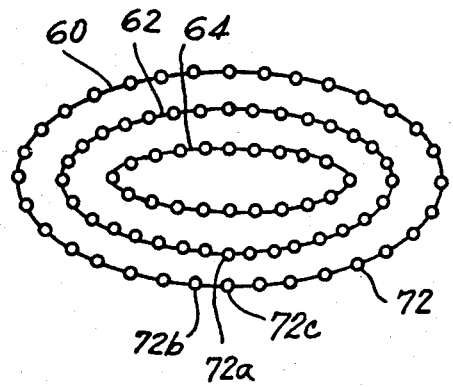
FIG. 10 is a plan view of an image seen by the camera at a predetermined level of the nested reference surfaces of FIG. 9.
Figure 12:
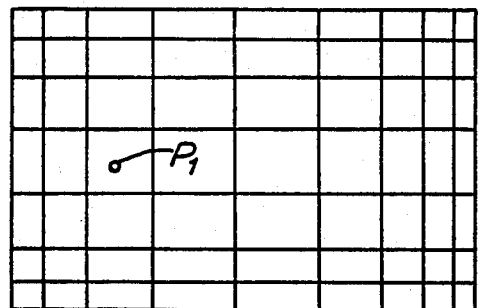
FIG. 12 is a plan view and shows the arrangement of a reticle derived from images taken by the camera of the reference surface.

After the configuration of FIG. 10, corresponding to a predetermined band on the surface 22 has been photographed, grid lines may be plotted for that band, as shown in FIG. 12. In this plot of grid lines, the points of intersection of elements 60, 62 and 64 with their respective vertical elements 66, 68 and 70 are first plotted and the grid work of FIG. 12 may be completed by drawing lines through these points of intersection, as well as through points inbetween the actual points of intersection, as obtained by interpolation. Depending on the relative angular positions of the elements 60, 62 and 64 with respect to the camera 40, for example, the spacing of the lines in the grid work 82 of FIG. 12, will be non-linear.

A typical point $P_1$ appearing on the surface 22 corresponding to the band of elements 60, 62 and 64, may be readily located with substantial precision by referring to the grid work 82 in FIG. 12. Other points on different bands on the surface 22 can be located in space, in a similar manner, by providing a typical grid work or reticle such as member 82, for the different bands involved. Thus, from an arrangement as shown in FIG. 9, it is possible to obtain a library of grid or reticles such as 82 for each of the bands or subdivisions of the surface 22, and after identifying the bands in which selected points appear, in accordance with the method described supra, it is possible to obtain the space coordinates of the points by superimposing, for example, the respective grids or reticles 82 on the photographs taken of the surface 22.

Figure 13:
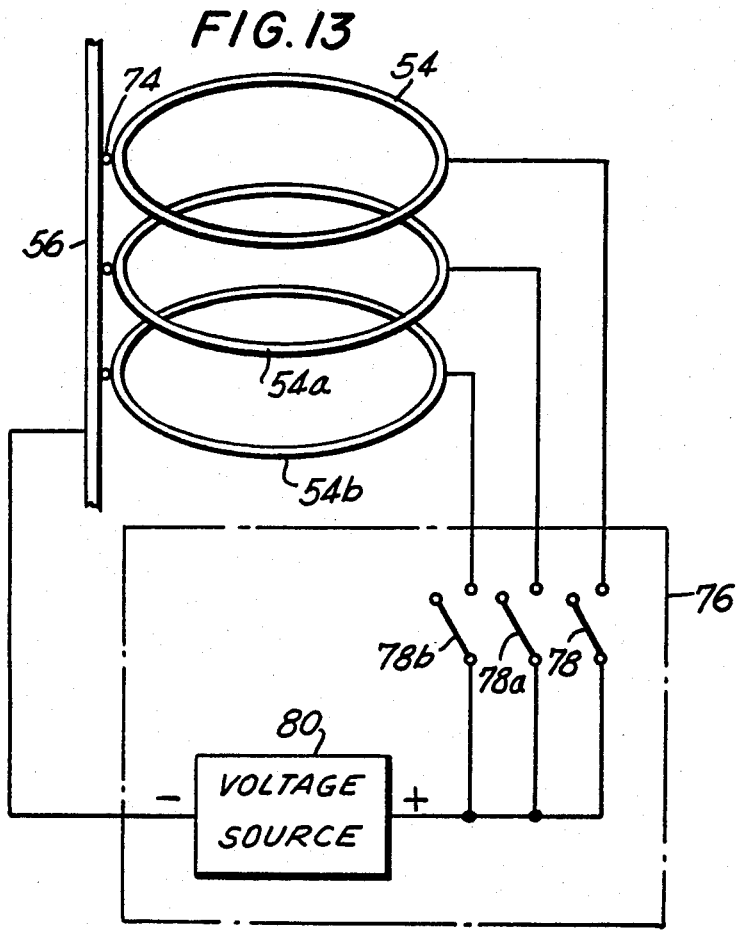
FIG. 13 is a schematic view of the circuit arrangement for obtaining the image of FIG. 7 for different levels of the reference surface.

To obtain the configurations of FIG. 10 and thereby a library of reticles or grids 82 for each of the bands involved, different levels of horizontal elements such as 54, 54a, and 54b may be connected in sequence to a switching and control circuit 76, as shown in FIG. 13. In the circuit 76, there are provided switches 78 which may be actuated in sequence for the purpose of applying a voltage source to levels 54, 54a, and 54b in sequence. When the switch 78 connects horizontal element 54 to the voltage source 80, the luminous element 74, for example, between horizontal element 54 and vertical element 56 becomes activated. All other luminous elements associated with the levels 54a and 54b, for example, remain turned off or inactive. This same procedure described in conjunction with horizontal element 54, can then be repeated for each of the remaining elements, such as elements 54a and 54b, by actuating the switches 78a and 78b in sequence. These switches can be actuated either manually or mechanically, as desired.

Figure 14:
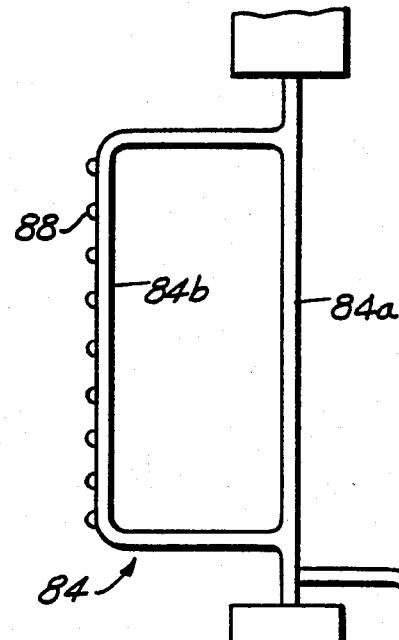
FIG. 14 is a schematic view and shows another embodiment of the construction of FIG. 13.

The configuration of FIG. 10 can also be generated by means of apparatus shown in FIG. 14. In this arrangement of FIG. 14, a tubular rectangular-shaped element 84 is rotated about an axis through the vertical portion 84a. The portion 84a includes projections extending into bearings 86, at the top and bottom thereof, which allows the rectangular-shaped element 84 to rotate. The rectangular-shaped element 84, furthermore, is provided with luminous elements 88 on the vertical portion 84b, which may be similar to the luminous elements 74 described above. These luminous elements 88 are connected to the switching and control circuit 76 by means of a cable 75 passing through the tubular structure of the element 84. The connection of the elements 88 to the switching circuit 76 is similar to that described above in relation to FIG. 13. By connecting each level of luminous elements 88 in sequence on the vertical portion 84b, and then rotating that vertical portion 84b about the axis through the portion 84a, the configuration of FIG. 7 may be obtained in conjunction with the camera 40, by switching the elements 88 sequentially, as the member 84 is rotated. Additional vertical portions such as 84b, may be mounted in parallel so as to provide the concentric configurations shown in FIG. 10.

In accordance with the present invention, it is not essential that the reference surface be in the form of a cylindrical surface, as described above. The reference surface may be also selected in the form of a spherical surface 90, as shown in FIG. 15, which is generated by elements of latitude 92 intersecting with elements of longitude 94. Such a reference surface 90 may be used in particular for closely enveloping the object 20.

In a similar manner, the reference surface may also be selected to have a star-shaped cross-section as shown in FIG. 16. In this star-shaped reference surface 96, for example, the horizontal elements 98 are star-shaped, whereas the intersecting elements 100 are vertically oriented straight-line elements. The character of the reference surface selected may depend on the shape of the surfaces 22, and the method of analysis used for interpolation and specification of the coordinates of points on the surface 22 as well as on the reference surface.

In accordance with the present invention, the known locations of the points of intersection on the reference surfaces may be inserted into a computer after scanning photographs of the reference surface, in a manner described in relation to FIG. 4. When a computer 48 is applied for this purpose, the computer can then carry out the necessary interpolations to specify the spatial coordinates and locations of points on the surface 22, with the desired precision. In using a computer for this purpose, therefore, the reticles or grids 82 become stored in the computer.

It is also a feature of the present invention that it is not necessary to locate a reference surface on the support 24 and carry out the procedures described in conjunction with FIG. 6. The reference surface may be specified mathematically by appropriate equations in the computer 48, for example. The configurations associated with FIGS. 10 and 12 may be calculated by the computer by taking into account the geometry and relative positions of the surface 22, projector 26, and camera 40. Thus, it is possible to derive the information contained in the reticle 82 and configuration of FIG. 10, by resorting to geometrical computations only. However, the use of geometric computations alone degrades accuracy since it does not compensate for lens distortions.

For purposes of scanning the entire surface 22 when using any one projector 26 and camera 40, for example, there is provided, in accordance with the present invention, a rotating and indexing mechanism 102 which rotates the support 24 through predetermined angles in progressive steps, to enable the projector and the camera to cover the periphery of the entire surface 22. For this purpose, the rotating and indexing mechanism 102 will index the support 24 through predetermined angles determined by the magnitude of the field of view of the projector and camera, for example, and hold the support 24 in the indexed position until the projector has carried out a complete procedure of cycles, as described in relation to FIG. 1. Rotations smaller than the field of view may be required in order to see around a portion of the object surface which masks another portion of the object surface from the camera or projector. A rotary indexing mechanism such as 102 is well known in the art, and for this reason is not described in further detail here.

It is also possible, in accordance with the present invention, to hold the object 20 stationary and to index rotationally the camera 40 and projector 26 about the surface 22, for the purpose of scanning the complete surface 22. Thus, it is only necessary to displace the object 20 relative to the projector 26 and camera 40.

As indicated above, the reference surface may be specified entirely by computation, and corresponding reticles for different levels or bands of the reference surface may be derived purely from considerations of relative geometrical positions of the surface 22, the camera and the projector. The camera and the projector, however, have optical elements containing inherent imperfections. Such optical imperfections do not lend themselves readily to theoretical prediction and computations. As a result, such optical imperfections can generally not be taken into account in the computations for deriving the reticles or grids 82.

To take into account the optical imperfections of the lenses and elements of the camera and projector, therefore, it is useful to provide a physical reference surface and carry out the sequence of steps connected with respect to the procedure of FIG. 6. In this manner, the reticles 82 incorporate directly any imperfections which may be present in the optical systems of the camera and the projector, so that the reticle 82 provides a true and precise configuration for determining the spatial coordinates of points, as observed by the camera 40, upon illumination by the projector 26. The use of a physical reference surface, therefore, does not require that the imperfections of the optical systems of the camera and projector be expressed in terms of mathematical relationships. The use of the reference surface in physical form, moreover, also simplifies the derivation of the grid 82 since it is not necessary to program involved and complex mathematical relationships expressing the geometrical relative positions between the surface 22, camera, and the projector.

It is an essential feature of the present invention that the reference surface does not have to conform to a particular shape. It is possible to use for the reference surface, substantially any convenient shape having a surface of known coordinates.

The present invention provides particularly for the location of the coordinates of points, on a three-dimensional surface. Referring to FIG. 1, the Z coordinate of a point P, for example, is determined by the band in which the point is found to be located, as determined from the operation of the projector 26 along the Z direction. The Y-X coordinates of the point P are then determined by scanning the photograph 44 and superimposing the grid or reticle 82 onto this photograph shown in FIG. 2a, for example. Superimposing of the grid or recticle 82 onto the photograph FIG. 2a for purposes of determining the Y-X coordinates of point P, may be carried out in a manual manner or by means of a computer 48, for example.

In subdividing the surface 22 into a series of bands by the projector 26, it is not necessary to operate the projector 26 in a manner so that only horizontal bands are produced, as described above. Instead, it is also possible to move or operate the projector 26, with substantially equivalent result, so as to obtain vertically oriented bands as shown in FIG. 17a. The projected bands on the surface 22 may, on the other hand, also be slanted or inclined at an angle of 45°, for example, as shown in FIG. 17b. At the same time, it is possible to use a combination of vertical and horizontal bands as shown in FIG. 17c, when the character of the surface 22 makes it advantageous to use this method of subdivision. An alternate method for subdividing the surface 22 into radial bands by the projector 26 is shown in FIG. 17d. Other methods which can be conveniently used for subdividing the surface consists of, for example, concentric circular bands shown in FIG. 17e and concentric square or rectangular bands as shown in FIG. 17f. When using the method of subdivision with square or rectangular bands, these may also be inclined or slanted as shown in FIG. 17g, when the character of the surface to be subdivided makes this method convenient. The method of subdividing a surface by means of orthogonal lines to form a grid network, for example, is shown in FIG. 17h. This configuration of FIG. 17h may be seen as one that can be derived by extending the lines over the area of FIG. 17c.

Figure 18:
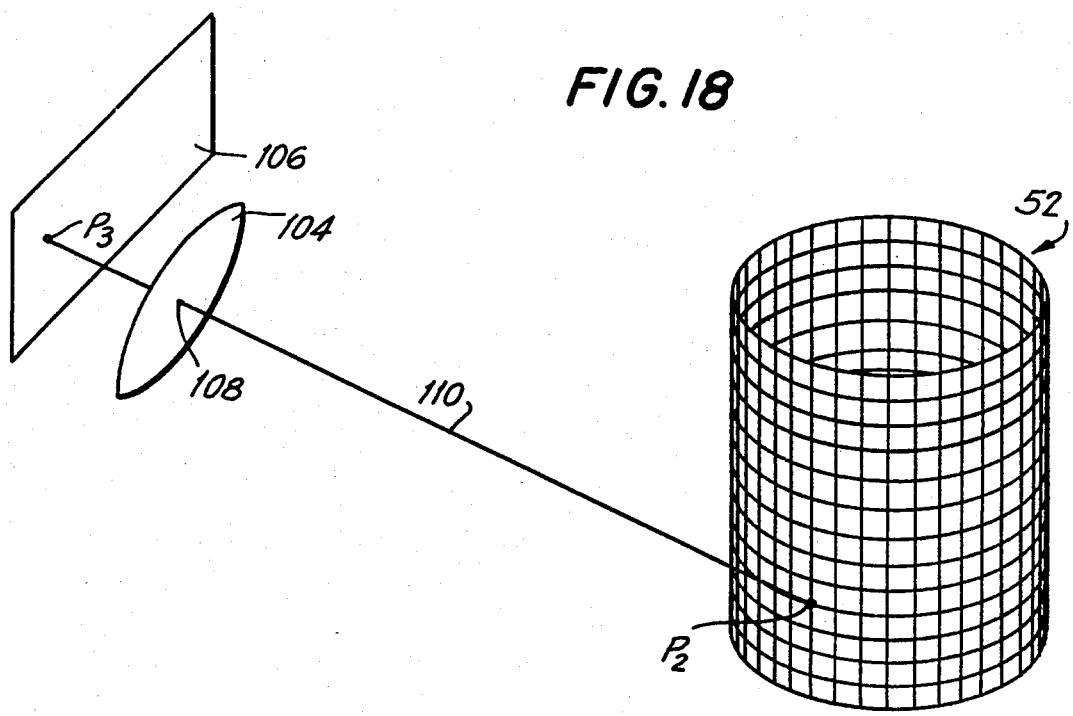
FIG. 18 is a schematic view and shows the method of the present invention for locating a point on a surface by the intersection of a line and a plane.
Figure 18A:
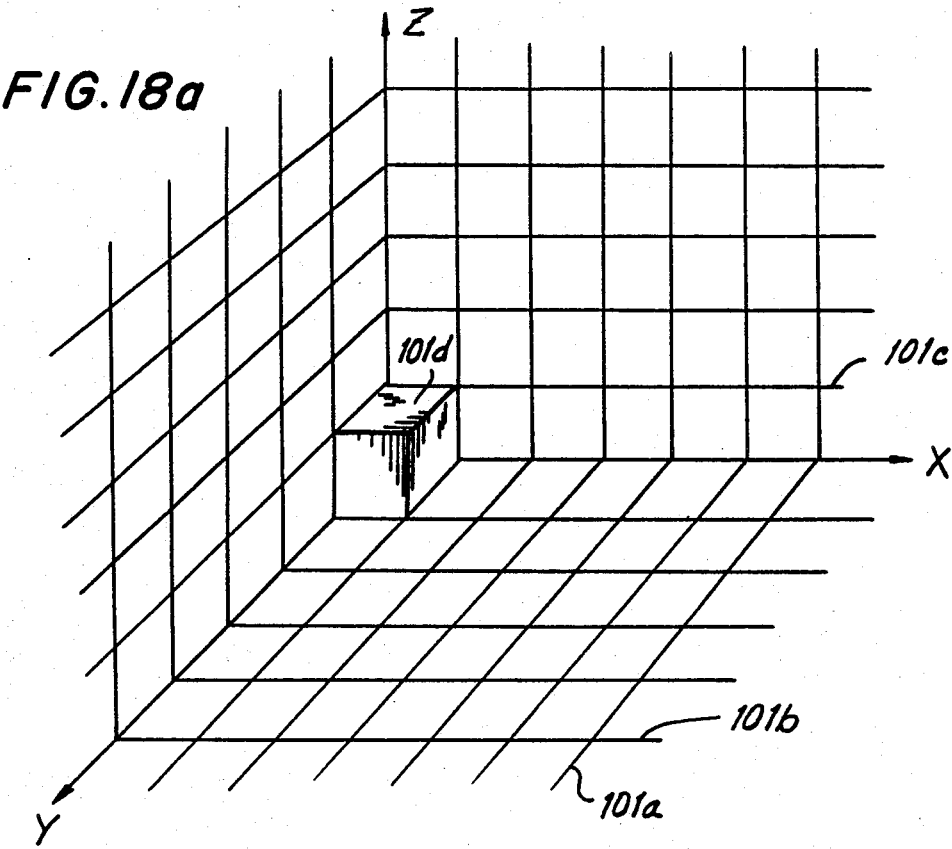
FIG. 18a is a diagrammatic view and shows the method of subdividing a volume of space into elements of volume.

The configuration of FIG. 17h can be extended to subdivide a solid object into elements of volume. Referring to FIG. 18a, for example, there is shown a set of coordinates X, Y, Z. By moving the Y-Z plane parallel to itself through predetermined increments, traces 101a mark the intersections of the Y-Z plane with the Y-X plane at those increments. Similarly, traces 101b mark the intersections of moving the Z-X plane parallel to itself through predetermined increments and normal to the Y-X plane. Traces 101a may be extended to the vertical lines marked on the Z-X plane, since moving the Y-Z plane parallel to itself, also produces intersections of the Y-Z plane with the Z-X plane at the predetermined increments. Similarly, traces 101b can, for the same reasons, be extended to the vertical lines marked in the Y-Z plane.

Traces 101a and 101b form a grid of squares in the Y-X plane (Z=0), assuming equal increments in both directions.

The squares may be extended to form elments of volume or cubes, for example, by moving the Y-X plane parallel to itself through equal increments, in the same manner described above, to produce traces 101c spaced at those increments along the Z axis. The combinations of the traces 101a, 101b and 101c result in subdividing a given volume into elements such the cubic element 101d.

Such subdivision of a solid into elements of volume is not confined to subdivision into cubic elments, for example. Thus, anyone of the planar configurations of FIG. 17 may be extended to form elements of volume or mass, so that rectangular, circular and radial elements, for example, may be obtained.

In the use of the reference cylindrical surface 52 or the star-shaped reference surface of FIG. 16, it is not essential to provide thereon markings or other designations which indicate elements of latitude, for example. The effect of such latitudes or horizontal elements may be obtained, in an equivalent manner, as moving the projector 26 through such predetermined increments that would mark these latitudes or horizontal elements. Similarly, the projector 26 may be moved in the other perpendicular direction to provide the characteristics associated with the longitude or vertical elements of the reference surfaces.

For the purpose of generating the subdividing patterns of FIG. 17 and the volumetric arrangement of FIG. 18a, it is necessary to move the projector 26 in three directions, for example. The apparatus for moving the projector in FIG. 1, provides for moving that projector along the Z direction. This apparatus can be duplicated and combined with the elements of FIG. 1 to further move the projector in both X and Y directions. It is also possible, on the other hand, to mount the projector 26 onto a platen 27 of conventional design and which is freely movable in X-Y-Z directions. Such platens 27 are well known in the art and are used extensively in conjunction with milling and contour machines, for example. Motions to the platen 27 may be applied by means of three independent motors 27a, 27b, and 27c. By controlling the operation of the motors 27a, 27b, 27c by means of the motor control unit 27d, the platen 27 and hence the projector 26 may be moved along any desired path and may be directed to generate the configurations of FIGS. 17 and 18a. For this purpose, the motor control unit 27d may be in the form of a functional generator which provides signals to the respective motors in a manner which controls their relative motions. For each motion the pattern projected by the projector should be thin in the direction corresponding to the projector motion. The controlling of motors in conjunction with a platen as described here, is well known in the art, particularly in contour cutting and milling, and for this reason is not described in further detail here.

Figure 18B:
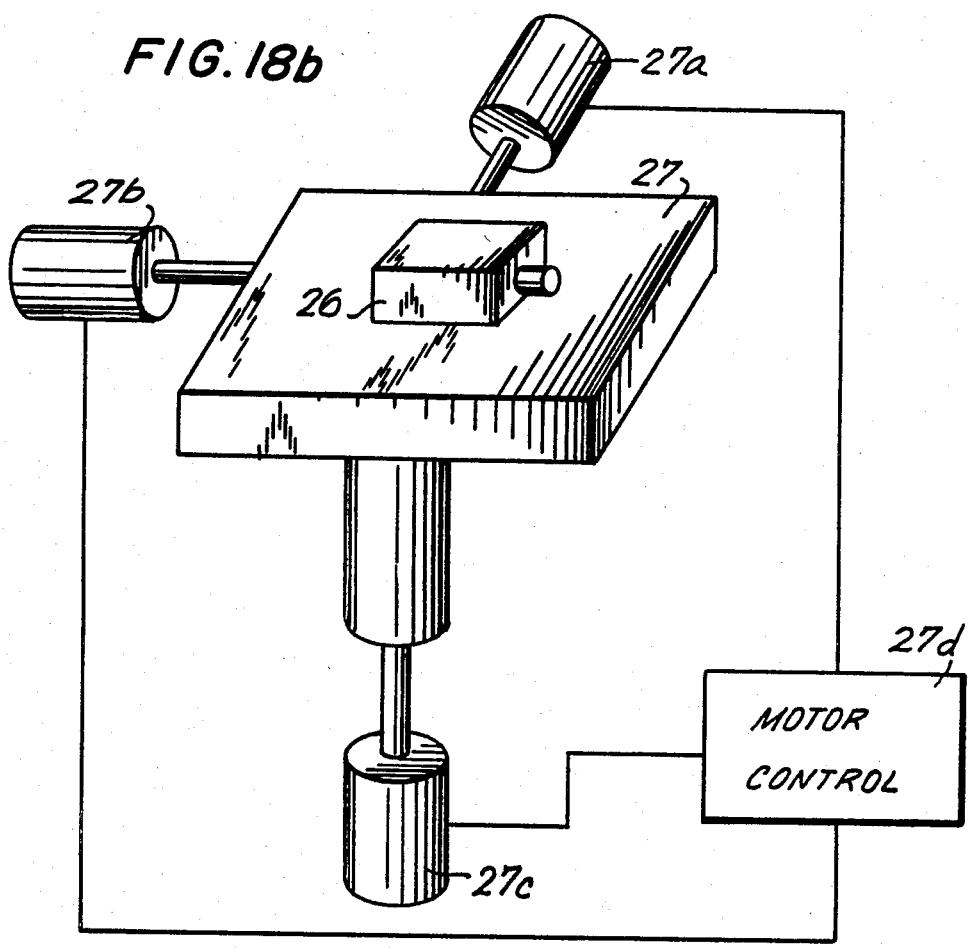
FIG. 18b is a schematic view and shows the arrangement for moving the projector in X-Y-Z directions.
Figure 18C:
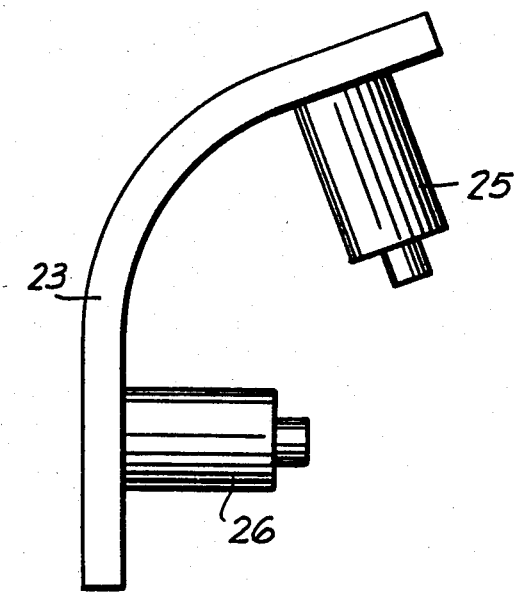
FIG. 18c is a schematic view and shows the method for operating a projector in conjunction with auxiliary projectors.

To coordinate the motion of the projector 26 with the function of the modulator 42, a shaft position encoder 31 is driven by the threaded member 30 and applies, by means of the readout head 33 a signal to the modulator, which indicates the position of the projector 26. Thus, the position of the projector 26 in FIG. 1, is dependent upon the angular rotation of the member 30, and since the encoder 31 is responsive to the position of this member 30, signals obtained from the readout head 33 are directly indicative of the angular position of the member 30, and hence of the translational position of the projector 26. The modulator 42 can then turn the projector on and off, as required, to obtain the patterns of FIG. 2, for example when the projector is moved for traversing the object 20. Shaft encoding devices such as the element 31 and readout head 33 are well known in the art. Similar devices may be used in conjunction with the construction of FIG. 18b where three separate modulators may be used in conjunction with the three separate and independent driving motors 27a, 27b, 27c. The coordination of the modulator 42 with respect to the position of the projector 26 is also applicable to the arrangement of FIG. 6 where the object 20 is replaced by a reference surface 52.

When using a single projector as shown in FIGS. 1 and 6, it is possible to obtain shadows in the photographs taken by the camera 40, due to the optical field limitations of the projector. For the purpose of avoiding such shadows in the photographs, it is possible to mount an auxiliary projector 25 on a connecting member 23, so that both projectors 25 and 26 are moved together. Modulator 42 then operates both projectors 25 and 26 simultaneously and synchronously. This same result may also be obtained by providing that the projector 26 has an additional lens, and a shutter which is operated common to both lenses.

In another embodiment of the present invention, the location of a point on a surface is determined from computations involving the intersection of a line and a plane. Referring to FIG. 18, there is shown the geometrical relationship between the reference surface 52, the lens 104 of the camera 40, and the film 106 on which the image of a point $P_2$ on the reference surface, appears after being photographed. From geometrical optics known in the art, a line drawn between $P_2$ and the corresponding image $P_3$ of that point on the film, will pass through the lens node 108. The lens node 108 can be considered a point in the camera lens 104 through which all light rays pass on their paths toward the film 106. Accordingly, a point $P_3$ appearing on the film 106 may be considered to lie on a line 110 which passes through the point $P_3$ and the lens node 108. To find the equation of the line 110 in spatial coordinates (x, y, z), the arrangement of FIG. 19 is used.

Two sources of light 112 and 114, or other means of radiation to which the film 106 is sensitive, are placed within the interior of the reference surface 52 and on the axis thereof. The sources of light or illumination 112 and 114 are spaced from each other along the axis of the reference cylindrical surface 52. After photographing these two sources 112 and 114, the film after being developed, shows that the source 112 is in the neighborhood of the intersection of the horizontal or latitude element 116 with the vertical or longitude element 124 which was also photographed and appears on the developed film. This intersection corresponds to point $P_4$ on the reference surface. In a similar manner, it is found that the source 114 appears on the developed film in the neighborhood of the intersection of the horizontal or latitude element 118 with the vertical or longitude element 124. This intersection corresponds to point $P_5$ on the reference surface. The sources of illumination 112 and 114 are made substantially small so that they can be considered point sources from the practical viewpoint.

Since source 112 as viewed on the film is approximately coincident with the image of point $P_4$, it is known that source 112, point $P_4$ and lens node 108 lie on a straight line. Similar analysis shows that source 114, point $P_5$ and lens node 108 lie on a straight line. Accordingly, lens node 108 must, therefore, lie on the intersection of these two lines. The trigonometric relationships are shown in FIG. 19a.

Figure 19:
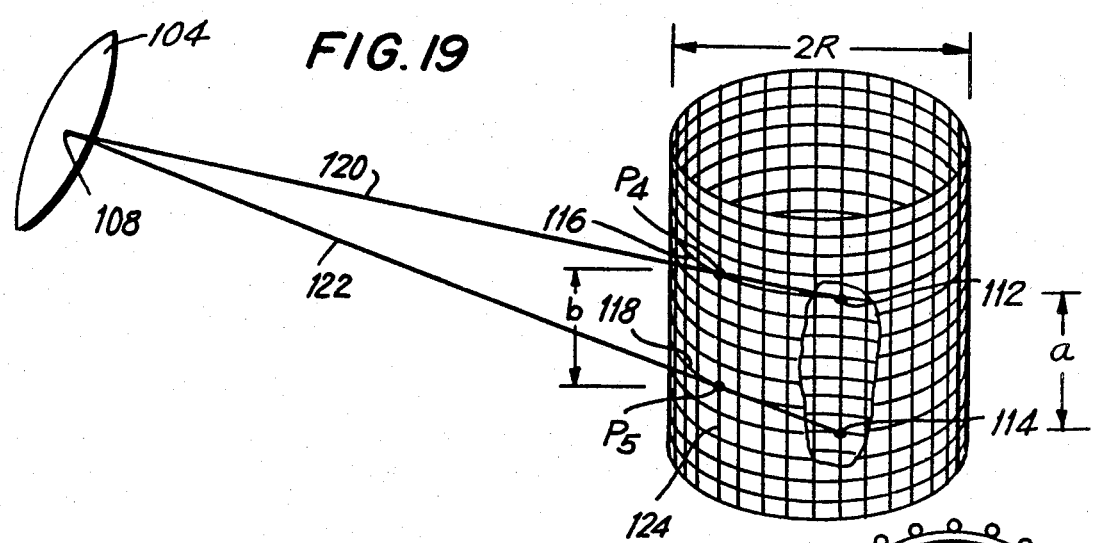
FIG. 19 is a schematic view and shows the method of determining the location of the lens code of the camera, in accordance with the present invention.
Figure 19A:
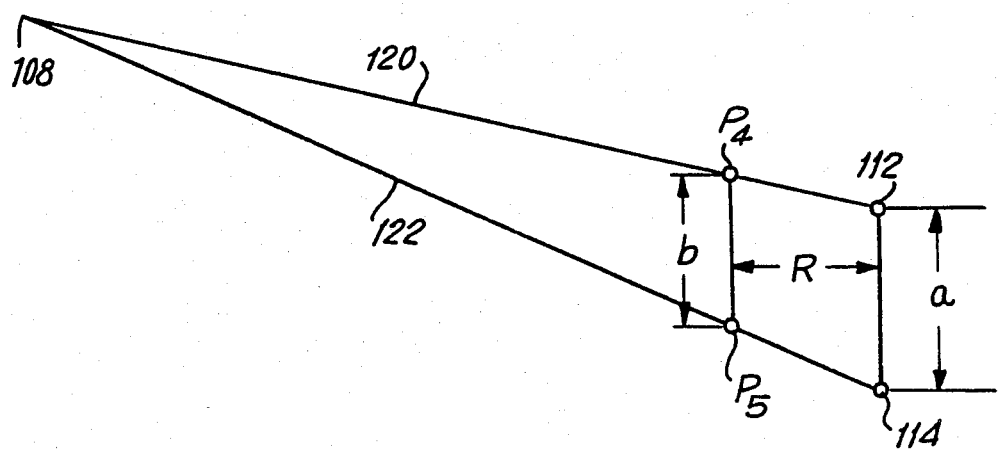
FIG. 19a is a diagrammatic view of the trigonometric relationships applicable to FIG. 19.

Since the radius of the reference surface, R, and the altitude of point 118 above point 114 and the distance a between sources 112 and 114 is known, and since the distance b between the elements 116 and 118 can be measured and is, therefore, also known, lines 120 and 122 pass through these known points as shown in FIG. 19 will intersect at the lens node 108 to form a triangular configuration. This procedure can be carried out graphically, from which it may be seen that the physical location of the lens node 108 may be determined in the plane of the triangle having vertices 108, 112, 114.

Figure 20:
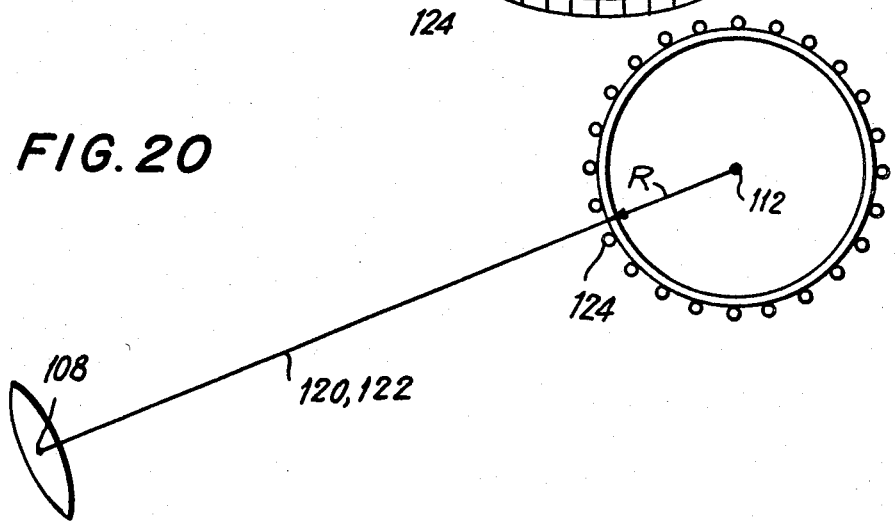
FIG. 20 is a plan view of the arrangement of FIG. 19.

To find the spatial coordinates of the point 108, it is also essential to take into account the angular orientation of the plane of the triangle 108, 112, 114. This is achieved in conjunction with FIG. 20 which shows a top view of the arrangement of FIG. 19. From this top view of FIG. 20, the direction of line 120 is determined by noting that on the developed film or photograph, the line 120 intersects the reference surface 52 in the neighborhood of longitude 124. The geometrical relationships of FIG. 20 may also be derived graphically in the manner similar to that described above in relation to FIG. 19. The graphical combinations of FIG. 19 and FIG. 20, therefore, specify the location of the point or lens node 108 in spatial coordinates (x, y, z).

Returning now to FIG. 18, it may be seen that the line 110 between the lens node 108 and the point $P_2$ on the reference surface may be expressed in terms of spatial coordinates (x, y, z), since the spatial coordinates of both points 108 and $P_2$ are known. Now, since the image of $P_2$ appears at point $P_3$ on the film 106, it may be seen that all points along line 110 would appear on the film at point $P_3$. Thus, if a point on a surface is photographed and its image appears on the film 106, at point $P_3$, it will be certain that the surface point lines somewhere along line 110. Thus every identifiable known point on the reference surface such as $P_2$ will define a known line between itself and lens node 108 and will further define a point on the film such as $P_3$ which corresponds to the known line. In effect, the picture of the reference surface may be used as an overlay to the pictures of an unknown surface to transform positions on the film to lines through the lens node that are geometrically exact. If one of these lines intersects the surface being photographed, at a particular plane, and that plane is also expressed in terms of spatial coordinates (x, y, z), then the point of intersection of the line and that plane may be calculated, and as a result a point appearing on a photograph from the developed film 106, for example, may be assigned spatial coordinates, when it is known in what plane on the surface that point lies. In applying the embodiments of FIGS. 18–20 in practice, a point P on the surface 22 is photographed with the arrangement of FIG. 1, for example. The subdivided band on the surface in which the point P lies, is then determined from the method described in relation to FIGS. 2–5, for example. If that band is then taken substantially narrow in width so that it may be sufficiently accurately represented by a plane defined by spatial coordinates (x, y, z), then spatial coordinates may be assigned to the point P, since that point may be solved for as the intersection of that plane and the line obtained from the position of the image of that point on the film.

To readily identify photographed points on the developed film 106 of the camera 40, in relation to the horizontal and vertical elements on the reference surface, it is desirable to photograph separately the points, the horizontal or latitude elements, and the vertical or longitude elements. Superposition of the respective images will then readily facilitate identification of the points' locations with respect to the latitude and longitude elements. This can be achieved by operating the circuit of FIG. 13, for example, so that the latitude and longitude elements are turned on or energized separately. Furthermore, by using varying colors with respect to different latitude and longitude neighboring elements, for example, the task of identifying locations of points on the photographs is further simplified.

Figure 21A:
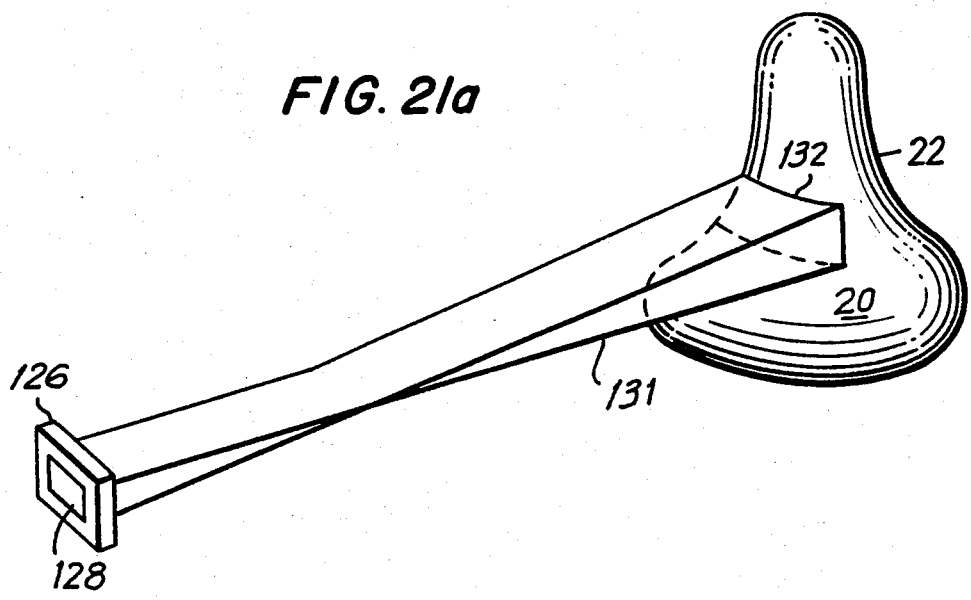
FIG. 21a is a perspective view and shows the intersection of a solid object with an element of volume of illumination in a focused arrangement.
Figure 21:
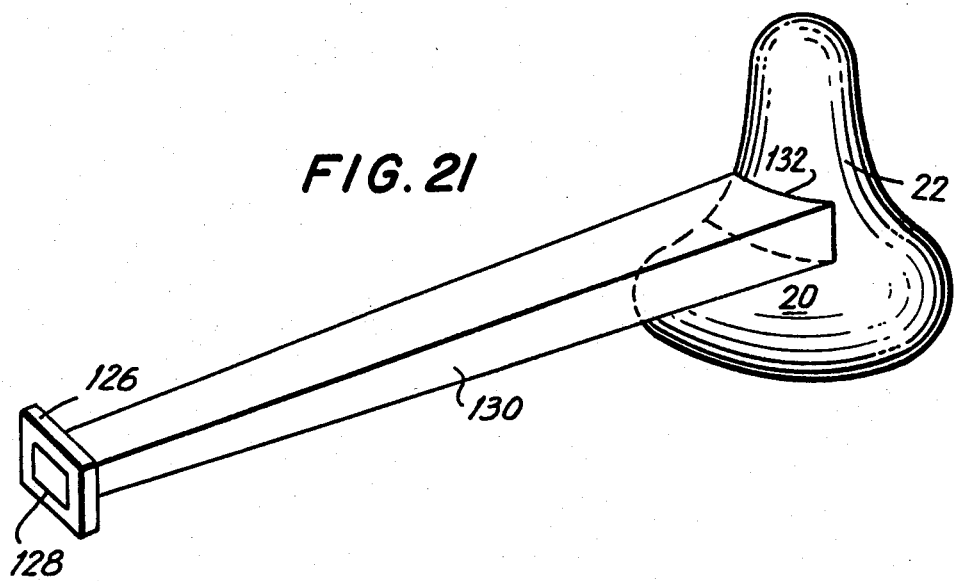
FIG. 21 is a perspective view and shows the intersection of a solid object with an element of volume of illumination in an unfocused arrangement.

To form the subdividing bands projected onto the surface 22 of the body or object 20, the projector 26 has an aperture element 126 through which the illumination or light exists from the projector. The aperture 126 has, for this purpose, a substantially rectangular-shaped slot or aperture 128. After exiting through this aperture 128, the light beam 130 from the projector, if unfocused, diverges prior to striking the surface 22. If focused, it converges to a focal point and so may be converging or diverging prior to striking the surface 22. As may be seen from FIG. 21 and FIG. 21a, the light beam 130 occupies an element of volume in the form of a divergent slice, for example, after passage through the opening 128. This element of volume then intersects or strikes the surface 22, and it is the intersection of the element of volume 130 and the surface 22 which forms the subdividing band or a portion thereof. Thus, the intersection of the element of volume 130 and the surface 22 comprises a surface of intersection for band 132 on the object 20.

As a result of the shape of the volumetric element 130, the band 132 illuminated on the object 20 possesses a finite depth. As a result, the location of a point P within such a band can be specified only to an accuracy permitted by the depth or resolution of the band as illustrated in FIG. 2, for example. To further subdivide such a band and thereby enable th point P to be located with greater precision, there is provided in accordance with the present invention, an arrangement in which a plurality of band patterns, in predetermined phase relationships, are applied to the object. The principle of operation of this arrangement is shown in FIG. 22.

Due to the physical and optical characteristics of the surface, projector, camera, film, and film scanning mechanism, which take into account imperfections and fringe effects, for example, the scanned read out of the intensity of illumination within the depth of the recorded band varies in accordance with the portion of the waveform shown in FIG. 22a between points 134 and 136. Thus, point 134 may be designated as the instant at which the projector 26 is turned on by the modulator 42. Point 136, on the other hand, is the instant at which the projector is again turned off by the modulator. Between these two instants, the intensity varies from a minimum to a maximum level, and then back to a minimum level. The level 138 above the axis 141 results from prevailing noise conditions, ambient light, and/or imperfections in the optical system of the projector, or camera or scanning mechanisms.

Consequently, if the projector 26 is moved relative to the object 20 and operated in conjunction with the modulator 42 for the purpose of applying a pattern of subdivided bands onto the object, that pattern of bands as recorded and scanned by the method of FIG. 4 may be represented by the result in the waveform of FIG. 22a.

Figure 22:
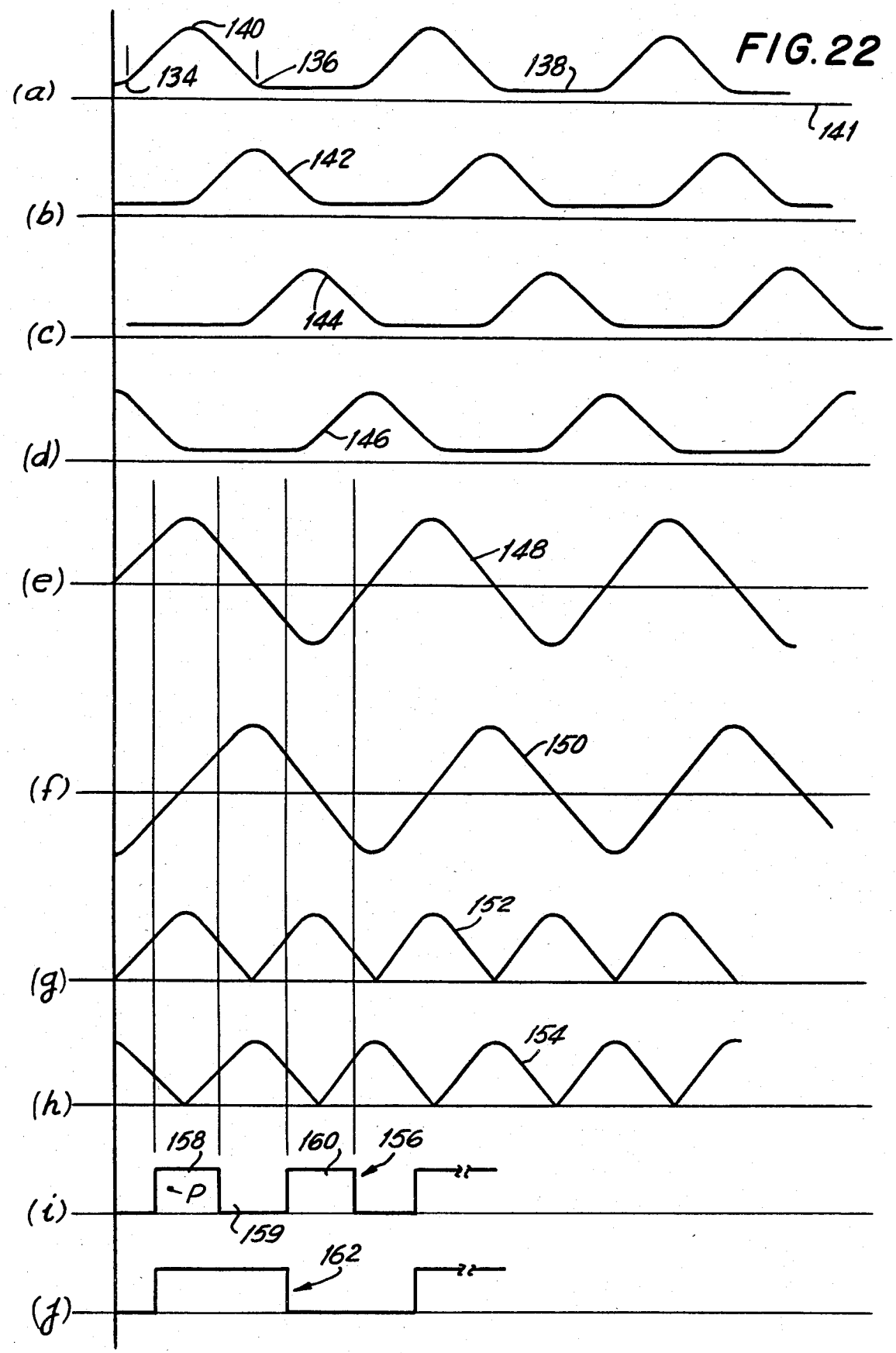
FIG. 22 is a diagrammatic view of related waveforms for obtaining improved resolution in defining the location of a point on a surface.

In accordance with the present invention, the projector operating in conjunction with the modulator first applies the pattern of bands of FIG. 22a, and then applies three band patterns displaced in phase from each other, as shown in FIGS. 22b–d. In accordance with this procedure, the projector 26 is moved to traverse the object 20 to produce a first pattern of bands denoted by the waveform 140 in FIG. 22a. Thereafter, the projector 26 traverses the object 20 a second time, to provide the band pattern 142 shown in FIG. 22b. The band pattern 142, however, is displaced in phase by a predetermined amount, with respect to the waveform or band pattern 140. In a similar manner, band patterns 144 and 146 are obtained by separate traversal of the projector 26 of the object 20. As may be seen from FIG. 22, waveforms 140, 142, 144, 146 are displaced in phase from each other progressively by equal increments within one period or cycle of the waveform. Thus, an additional phase displacement of that same increment with respect to the waveform 146, will result in a return to the waveform 140.

In processing the information contained in waveforms 140, 142, 144, 146, the two waveforms 140 and 144 are subtracted from each other to result in the waveform 148 in FIG. 22e. For this purpose, waveform 144 may be inverted and then added to waveform 140. The result is the same as subtracting waveform 144 from waveform 140. Since each of the waveforms in FIGS. 22a–d are displaced in phase progressively by 90°, waveform 144 is displaced by 180° from waveform 140. As a result of this particular phase displacement between these two waveforms, the subtraction of waveform 144 from waveform 140 causes the cancellation or removal of the level 138 from the signal 148. This feature may be seen, for example, when a negative sign is assigned to the ordinates of waveform 144, and these negative ordinates are then algebraically added to the respective positive ordinates of waveform 140. In a similar manner, waveform 146 is subtracted from waveform 142, to provide the resultant waveform 150 shown in FIG. 22f.

The subtraction of the waveforms as carried out above, where the waveforms are displaced by a maximum amount from each other as, for example, 180°, provides signals 148 and 150 having a peak-to-peak amplitude which is twice that of the original signals, and which possesses, moreover, steep regions resulting in advantages to be described.

After signals 148 and 150 have been obtained, the negative portions of these signals are converted to positive portions so as to result in the respective waveforms 152 and 154. Accordingly, waveform 152 is obtained by flapping the negative portions of the respective waveform 148 up to the positive region of the plane. This same condition may be expressed in other terms by converting the waveform 148 to one having only absolute values. The two waveforms 152 and 154 are then compared to obtain the pulse-shaped waveform 156 shown in FIG. 22i.

The comparison of waveforms 152 and 154 is carried out by noting which waveform has the greater ordinate at any one instant. When, for any ordinate, the absolute value of waveform 152 is greater than that of waveform 154, a high level or "1" is assigned to the pulse-shaped waveform 156. When, on the other hand, the absolute value of signal 154 is greater, for any ordinate, than the respective value of signal 152, then a low level or "0" is assigned to the pulse-shaped waveform 156.

In viewing waveform 156, it may be seen that a single cycle of the waveform 140 has been subdivided into substantially four increments.

If upon standing or examining the waveform 156 by apparatus similar to that described in conjunction with FIG. 4, it is found that point P lies within a portion of the waveform beneath the high or "1" level, it is still not possible to determine whether point P lies within the portion 158 or within the portion 150 of the waveform 156. Additional information is required in conjunction with the waveform of FIG. 22i, and such information is obtained from FIG. 22j. The waveform 162 of this figure is obtained by examining signals 148 and 150 to determine the sign of the portion of the signal which has the largest ordinate. If the sign is positive of the larger ordinate, then a high level or "1" is assigned. If, on the other hand, the signal 148 or 150 has a negative sign when possessing the largest ordinate, then a low level or "0" is assigned. Thus, in examining signals 148 and 150 during the interval corresponding to the portion 158 of the waveform 156, it is seen that signal 148 has the larger ordinates during that interval, and that during this interval, furthermore, signal 148 is positive. Accordingly, the portion of waveform 162 corresponding to portion 158 is assigned a high or "1" level. If the low level portion 159 of the waveform 156 is next examined in relation to signals 148 and 150, it is seen that the ordinates of signal 150 are larger and have a positive sign. Accordingly, waveform 162 is also assigned a high level for this corresponding portion 159. When viewing portion 150 of waveform 156 next, it is seen that signal 148 has the larger ordinate during that portion, and these ordinates of signal 148 are negative. Accordingly, a low level or "0" is assigned to waveform 162 for the interval corresponding to the portion 160.

By now examining the two waveforms 156 and 162, it may be seen that it is possible to determine that point P lies indeed in the portion 158 and not in 160, since only during that interval corresponding to portion 158, will the point P also appear within a region in waveform 162, beneath a high level or "1" level. In principle, the two waveforms 156 and 162 when taken together provide signals of fine and coarse resolutions, respectively.

Figure 23:
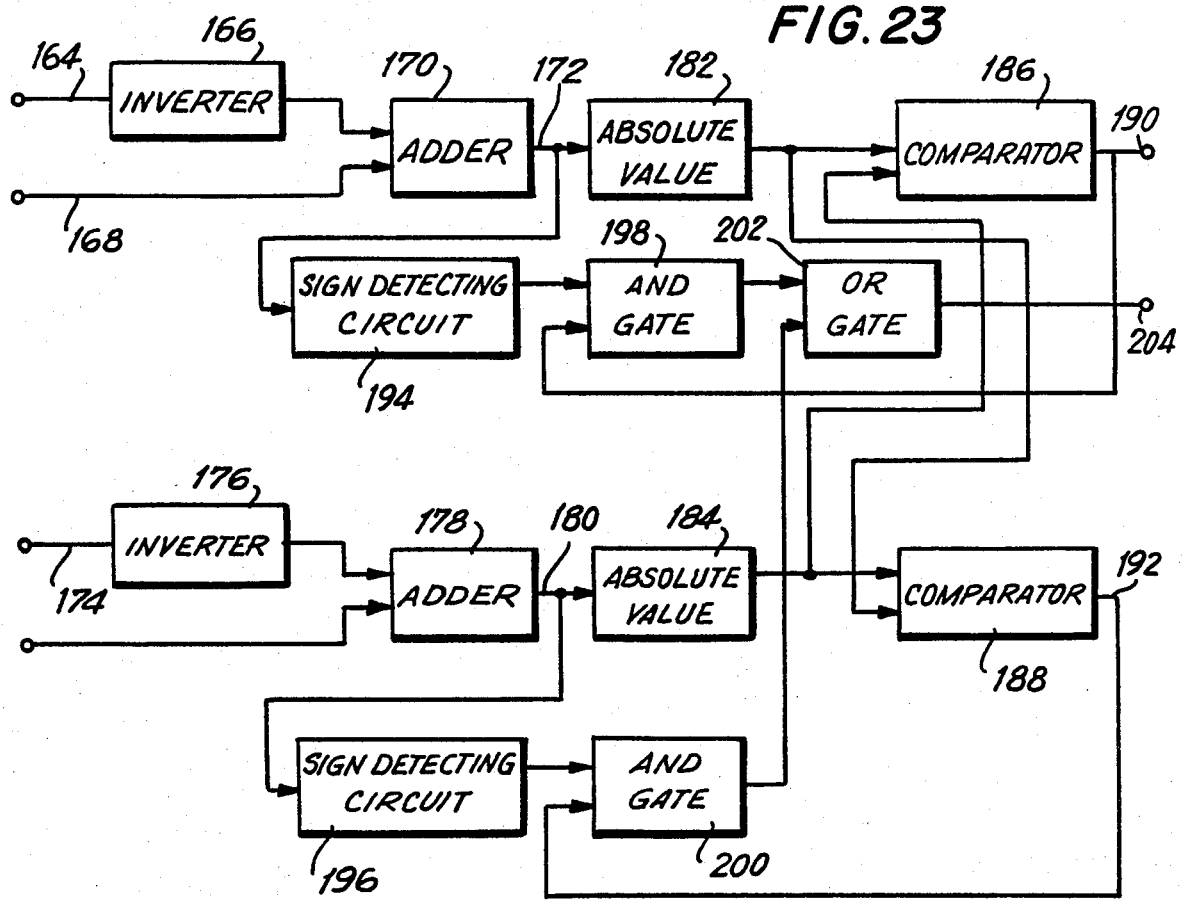
FIG. 23 is a schematic view of an arrangement for obtaining the waveforms shown in FIG. 22.

The apparatus for obtaining the signals of FIG. 22, is shown in FIG. 23. Signal 144 is applied to the input 164 of an inverter 166. Signal 140, on the other hand, is applied directly to one input 168 of an adder 170. The other input of the adder 170 is connected to the output of the inverter 166. The adder, therefore, produces at its output 172 the signal 148 which is the difference between signals 140 and 144. In a similar manner, signal 146 is applied to an input 174 of a second inverter 176, while signal 142 is applied directly to one input of a second adder 178. Both inverters 166 and 176 serve to change only the sign of the signals applied to their respective inputs. The output 180 of the adder 178, consequently, provides the signal 150.

To obtain the absolute values of the signals 148 and 150, absolute value circuits 182 and 184 are connected respectively, to the outputs 172 and 180 of the respective adders. These absolute value circuits render their input signals unipolar in a manner well known in the art.

Each of the outputs of the two absolute value circuits 182 and 184, is connected to one input of two comparators 186 and 188. The comparator 186 applies to its output 190 a high level output signal, when the signal input from circuit 182 exceeds the signal input from circuit 184. Accordingly, comparator 186 performs the operation of comparing signals 152 and 154. When the input signal from circuit 184 is greater than the input signal from circuit 182, the comparator 186 applies to its output 190 a low-level signal. Accordingly, the signal drived from the output 190 of the comparator 186, corresponds to the signal or pulse train 156.

To obtain signal 162, sign detecting circuits 194 and 196 are connected, respectively to the output of adders 170 and 178. These detecting circuits 194 and 196 are used to examine the sign of the ordinates of signals 148 and 150, as already described above. Such circuits used to detect the sign or polarity of a signal are well known in the art and are, for this reason not described in further detail here.

The output of the sign detecting circuit 194 is connected to a first AND gate 198. Another input to this gate 198 is connected to the output 190 of the comparator 186. The output of the sign detecting 196, on the other hand, is connected to a second AND gate 200 which has another input derived from the output 192 of comparator 188. The two outputs of gates 198 and 200 are applied, in turn, to the inputs of an OR gate 202.

In operation of elements 198, 200, 202, the output of comparator 186 will provide a high-level signal to gate 198, when the signal output from absolute value circuit 182 exceeds that of circuit 184. If, at the same time, the signal applied to input 168 of the adder 170 exceeds in magnitude the signal applied to the input 164, sign detecting circuit 194 applies a high-level signal to the other input of gate 198. As a result, the output of gate 198 is at a high level, and is transmitted to the output 204 of the OR gate 202. The output signal at terminal 204, therefore, correspond to the signal 162 for the interval designated by the portion 158.

For the interval associated with the portion 159, comparator 188 provides a high-level output signal since the ordinates of signal 154 exceed those of signal 152 during this interval. The high-level output from comparator 188 is applied to gate 200. Since, during this same interval corresponding to portion 159, the ordinates of signal 142 exceed those of signal 146, sign detecting circuit 196 will also apply a high-level signal to gate 200. As a result, gate 200 transmits a high level signal through OR gate 202 to the output 204 during this interval associated with the signal portion 159. In examining the signal or pulse train 152, it is seen that this signal 162 may be derived directly from the output terminal 204. Accordingly, output 204 when taken in conjunction with output 190 will provide the pulse trains 156 and 162 which serve to provide the fine and coarse resolutions discussed previously in subdividing further a projected illuminated band into four discrete intervals.

Figure 24:
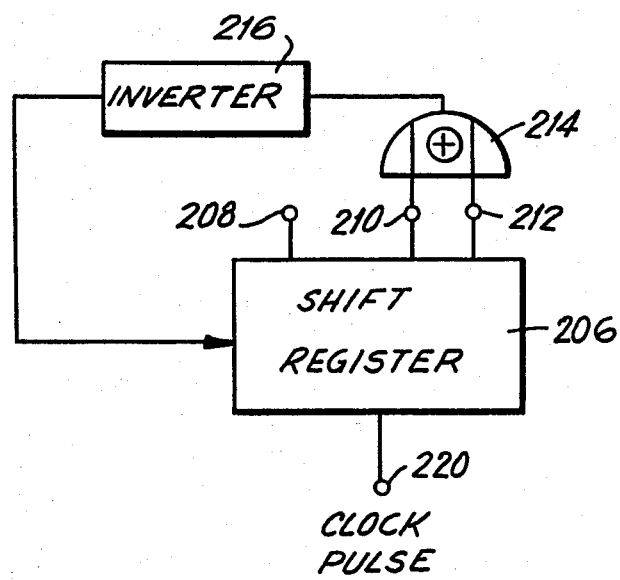
FIG. 24 is a circuit diagram of an arrangement for obtaining a shift code for use in conjunction with the present invention.

In the application of coding methods discussed in relations to FIGS. 2–5, for example, a three-bit shift code is also useful. This code has particular advantages for identifying the latent and longitudinal elements of the reference surfaces. Such a three-shift code described in tabular form below, may be generated by means of the circuit shown in FIG. 24.

| Pulse | TERMINAL | | |
| --- | --- | --- | --- |
| No. | 208 | 210 | 212 |
|   | 0 | 0 | 0 |
| 1 | 1 | 0 | 0 |
| 2 | 1 | 1 | 0 |
| 3 | 0 | 1 | 1 |
| 4 | 1 | 0 | 1 |
| 5 | 0 | 1 | 0 |
| 6 | 0 | 0 | 1 |
| 7 | 0 | 0 | 0 |

Thus, the three-bit shift code above is generated by means of a shift register 206 having terminals 208, 210, 212. Terminals 210 and 212 are applied to the inputs of an EXCLUSIVE OR 214. The output of this gate 214 is applied through an inverter 216 to the input of the shift register 206. The register receives a clock pulse at the terminal 220. In analyzing the sequence of pulses appearing at terminals 208, 210, 212, as tabulated above, it is seen that the sequence of pulses at terminal 210 is shifted by one place with respect to the sequence of pulses at terminal 208. Similarly, the sequence of pulses at terminal 212 is shifted by one place with respect to the sequence of pulses at terminal 210. It is this characteristic of the code which designates the code as a shift code. The particular property of the shift code whereby the sequence of pulses is shifted only to obtain another sequence, makes it possible to readily detect errors which may arise in the coding and identification procedures. Thus, since the sequence of pulses is predetermined, it is readily possible to detect if a "1" or "0" is erroneously present in the sequence. For this purpose, it is possible to examine only the last three bits of a sequence and determine therefrom the present state of the shift register and consequently to predict the subsequent bit of the sequence. In view of such predictable characteristcs of the code, computer processing of the photographs for identification purposes as discussed in relation to FIGS. 2-5 above, is also particularly advantageous.

In scanning the photographs 44 in FIG. 4, it is not essential that the scanner 46 be in the form of an electron beam scanner, for example. The scanner may also be in the form of a photoelectric scanner or other optical scanner as already known in the art.

It is, furthermore, not essential that the camera 40 be of a conventional film camera. Instead, this function of the camera for recording the images may be carried out by means of photo diodes, vidicon means, or other sensors and devices conventionally used for storing information in digital or analog form including magnetic tape and drums, for example. At the same time, the image information may be stored directly in the memory of a computer, and such memory may be comprised of a core memory, solid state devices, as well as magnetic disc, drum, and tape.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

We claim:

1. A method for sensing and locating points on a surface comprising the steps of: generating a projection field directed onto a surface; applying relative motion between said projection field and said surface in at least one direction parallel to a coordinate axis applied to the surface; subdividing said projection field into a number of selected sections during said relative motion and irradiating said surface with different variations of said subdivided projection field so that each section is illuminated at least once; recording within a field of view images of said surface as irradiated by the subdivided projection field; recording a calibrated reference surface and correlating said recorded images in relation to said reference surface to define the location of a predetermined point on said surface first-mentioned and appearing within said field of view.

2. The method as defined in claim 1 including the step of irradiating the selected sections.

3. An arrangement for sensing and locating points on a surface comprising, in combination, means for generating a projection field directed onto a surface; means for applying relative motion between said projection field and said surface in at least one direction parallel to a coordinate axis applied to the surface; said means for applying relative motion between said projection field and said surface subdividing said projection field into a number of selected sections during said relative motion and irradiating said surface with said subdivided projection field; means for recording within a field of view selectively images of said surface as irradiated by the subdivided projection field; a calibrated reference surface; and means for reading said recorded image in relation to said reference surface to define the location of a predetermined point in said sections and appearing within said field of view.

4. The arrangement as defined in claim 3 wherein the selected sections of said surface are irradiated.

5. The arrangement as defined in claim 4 wherein said reference surface is a substantially spherical surface.

6. The arrangement as defined in claim 4 wherein said reference surface has a substantially star-shaped cross-section.

7. The arrangement as defined in claim 2 wherein the recording of said images of said reference surface comprises the recording of substantially points on said reference surface.

8. The method as defined in claim 1 wherein said correlating step comprises further defining the spatial location of said predetermined point on said first-mentioned surface by the intersection of a line and a plane in which said point lies.

9. The arrangement as defined in claim 3 said means for applying relative motion between said projection field and said surface including means for subdividing said sections into a plurality of subsections.

10. The arrangement as defined in claim 4 wherein the spatial location of said predetermined point on said first-mentioned surface is defined by the intersection of a line and a plane in which said point lies.

11. A method for sensing and locating points on a surface comprising the steps of: generating a projection field directed onto a surface; applying relative motion between said projection field and said surface in at least one direction parallel to a coordinate axis applied to the surface; subdividing said projection field into a number of selected sections during said relative motion and irradiating said surface with said subdivided projection field; recording within a field of view selectively images of said surface as irradiated by the subdivided projection field; reading said recorded images to define the location of a predetermined point on said surface and appearing within said field of view, said projection field being subdivided in accordance with a predetermined computational code, said predetermined point being irradiated in accordance with a code assigned to the selection of the projection field irradiating said point; recording selectively images of subdivided sections of a predetermined reference surface; and relating the images of said first-mentioned surface with the images of said reference surface for defining the spatial location of said predetermined point on said first-mentioned surface; the spatial location of said predetermined point on said first-mentioned surface being computed from an intersection of said reference surface with a line from the position of a recorded image of said predetermined point and passing through a lens node used in said recording steps.

12. A method as defined in claim 11, wherein said projection field is subdivided successively in accordance with said predetermined computational code.

* * * * *